US012572742B1

(12) United States Patent
Sadasivam et al.

(10) Patent No.: US 12,572,742 B1
(45) Date of Patent: Mar. 10, 2026

(54) HEURISTIC-BASED MULTILANGUAGE TOKENIZER

(71) Applicant: WhatsApp LLC, Menlo Park, CA (US)

(72) Inventors: Sesh Sadasivam, Santa Clara, CA (US); Amey Sakhadeo, Palo Alto, CA (US); Roozbeh Pournader, Union City, CA (US)

(73) Assignee: WhatsApp LLC, Menlo Park, CA (US)

( * ) Notice: Subject to any disclaimer, the term of this patent is extended or adjusted under 35 U.S.C. 154(b) by 587 days.

(21) Appl. No.: 18/082,450

(22) Filed: Dec. 15, 2022

Related U.S. Application Data

(60) Provisional application No. 63/357,556, filed on Jun. 30, 2022.

(51) Int. Cl.
G06F 40/284 (2020.01)
G06F 40/47 (2020.01)

(52) U.S. Cl.
CPC ............ G06F 40/284 (2020.01); G06F 40/47 (2020.01)

(58) Field of Classification Search
CPC ............................. G06F 40/284; G06F 40/47
See application file for complete search history.

(56) References Cited

U.S. PATENT DOCUMENTS

| | | | |
|---|---|---|---|
| 7,369,987 B2 | 5/2008 | Loofbourrow et al. | |
| 2005/0022115 A1* | 1/2005 | Baumgartner | ...... G06F 16/9535 |
| | | | 715/205 |

| | | | | |
|---|---|---|---|---|
| 2008/0263033 | A1* | 10/2008 | Vailaya | ................ G06F 16/334 |
| 2016/0307000 | A1* | 10/2016 | Nguyen | ................ G06F 40/232 |
| 2017/0220557 | A1* | 8/2017 | Hoffenberg | ........... G06F 40/211 |
| 2018/0060314 | A1* | 3/2018 | Xu | ........................ G06F 16/258 |
| 2021/0326390 | A1* | 10/2021 | Aher | ....................... G06F 40/30 |

FOREIGN PATENT DOCUMENTS

| | | |
|---|---|---|
| EP | 1355237 A2 | 10/2003 |

OTHER PUBLICATIONS

Apache Lucene., "Lucene 4.0.0 Analyzers-icu API," Oct. 16, 2012, 6 pages, Retrieved from the Internet: URL: https://lucene.apache.org/core/4_0_0/analyzers-icu/index.html.

(Continued)

*Primary Examiner* — Athar N Pasha
(74) *Attorney, Agent, or Firm* — EVERSHEDS SUTHERLAND (US) LLP

(57) ABSTRACT

Methods, systems, and storage media for providing a heuristic multilanguage tokenizer in a web browser environment are disclosed. Exemplary implementations can receive a query; generate a query set comprising at least one query token; generate a result set from a searchable phrase, wherein the result set comprises at least one phrase token; generating at least one supplemental set. Determining that any of the sets comprise at least one of: a first character-type, a second character-type, or an emoji. In response to determining the first character-type: determining a word boundary and extracting a diacritic. In response to determining that the query, result set and the supplemental set comprise the second-type or the emoji, adding a space around each second character-type or emoji in the set; and segmenting the set into a plurality of tokens.

17 Claims, 10 Drawing Sheets

(56) References Cited

OTHER PUBLICATIONS

Bigi B., "A Multilingual Text Normalization Approach," Human Language Technology Challenges for Computer Science and Linguistics, Jan. 1, 2014, 5 pages.

EPO—European Search Report for related European Patent Application No. 23182229.7, dated Oct. 4, 2023, 6 pages.

Hassler M., et al., "Text Preparation through Extended Tokenization," WIT Transactions on Information and Communication Technologies, Jun. 2006, vol. 37, pp. 13-21.

Mukund S., et al., "An Information-Extraction System for Urdu-A Resource-Poor Language," ACM Transactions on Asian Language Information Processing, Dec. 1, 2010, vol. 9, No. 4, 43 pages.

* cited by examiner

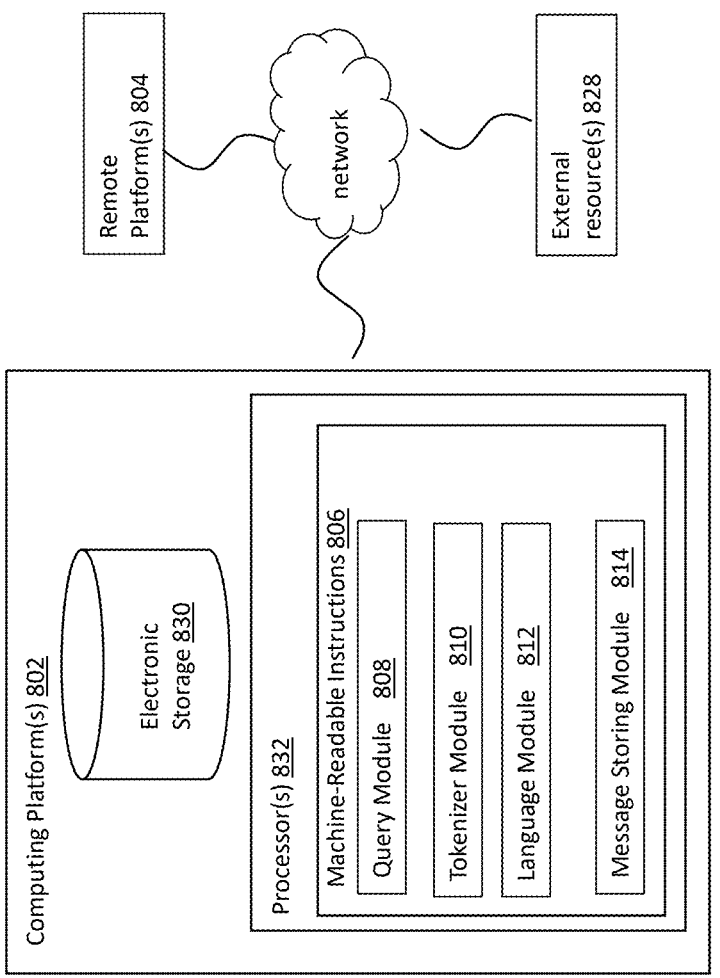
FIG. 8

900

902

Receiving a query.

904

Generating a query set comprising at least one query token.

906

Generating at least one of a result set and a supplemental set from a searchable phrase, wherein the result set and the supplemental set comprises at least one phrase token.

908

Determining that the query and the searchable phrase comprise: a first character-type, a second character-type, or an emoji.

910

In response to determining that the query and searchable phrase comprise the first character-type:
determining at least one word boundary,
determining at least one diacritic in the searchable phrase, and
extracting the at least one diacritic from the result set and the supplemental set.

912

In response to determining that the query and the searchable phrase comprise the second-type or the emoji, adding a space around each second character-type or emoji in the query set and the result set.

914

Segmenting the query set and result set into a plurality of tokens.

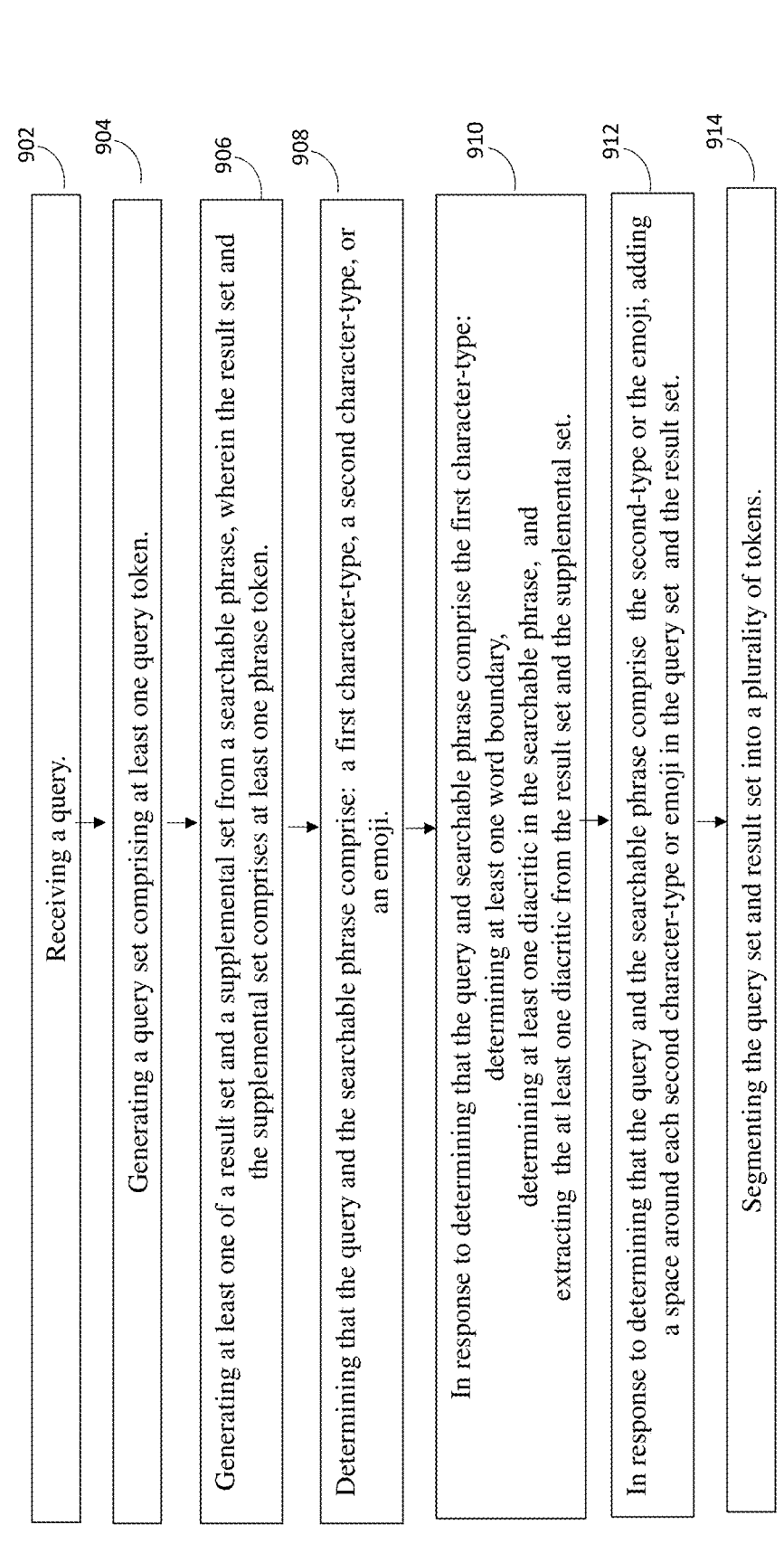

FIG. 9

HEURISTIC-BASED MULTILANGUAGE TOKENIZER

CROSS REFERENCE TO RELATED APPLICATIONS

This application claims priority under 35 U.S.C. § 119(e) to U.S. patent application Ser. No. 63/357,556 filed Jun. 30, 2022, the disclosures of which applications are incorporated by reference herein, in their entirety, for all purposes.

TECHNICAL FIELD

The present disclosure generally relates to providing a multilanguage tokenizer, and more particularly to a multilanguage tokenizer in a web browser environment.

BACKGROUND

There are certain instances in which users attempt to perform tokenizers or text segmentation of text data. For example, in performing the search on a mobile device, the messaging platform may use word-segmentation and tokenization libraries provided by a mobile device operating system. However, implementing text segmentation in a web browser creates additional difficulties due to the limitations of operating in a web browser environment. In particular, text segmentation that is applicable and consistent across multiple languages creates difficulty. The nuances of each language can create an issue for text segmentation in the absence of an accessible third-party library or module in an operating system. Further complicating the matter are size requirements and universal compatibility of these features may not be compatible in the limitations of a web browser environment.

BRIEF SUMMARY

The subject disclosure provides for systems and methods for providing a tokenizer for natural language text in a web browser environment. In one embodiment, the present disclosure relates to a computer-implemented method for tokenizing natural language text in a web browser environment. The method may include receiving a query. The method may include generating a query set comprising at least one query token. The method may include generating at least one of a result set and a supplemental set from a searchable phrase. The result set and the supplemental set can comprise at least one phrase token. The method can include determining that the query and the searchable phrase comprise: a first character-type, a second character-type, or an emoji. In response to determining that the query and searchable phrase comprise the first character-type, the method can include determining at least one word boundary; determining at least one diacritic in the searchable phrase; and extracting the at least one diacritic from the result set and the supplemental set. In response to determining that the query and the searchable phrase comprise the second-type or the emoji, the method can include adding a space around each second character-type or emoji in the query set and the result set. The method can include segmenting the query set and result set into a plurality of tokens.

In another embodiment, the present disclosure relates to a system configured for tokenizing natural language text in a web browser environment. The system may include one or more processors configured by machine-readable instructions. The processor(s) may be configured to receive a query.

The processor(s) may be configured to generate a query set comprising at least one query token. The processor(s) may be configured to generate at least one of a result set and a supplemental set from a searchable phrase, wherein the result set and the supplemental set comprises at least one phrase token. The processor(s) may be configured to determine that the query and the searchable phrase comprise: a first character-type, a second character-type, or an emoji. In response to determining that the query and searchable phrase comprise the first character-type, the processor(s) may be configured to determine at least one word boundary; determine at least one diacritic in the searchable phrase; and extract the at least one diacritic from the result set and the supplemental set. In response to determining that the query and the searchable phrase comprise the second-type or the emoji, the processor(s) may be configured to add a space around each second character-type or emoji in the query set and the result set. The processor(s) may be configured to segment the query set and result set into a plurality of tokens.

In yet another embodiment, the present disclosure is related to a non-transient computer-readable storage medium having instructions embodied thereon, the instructions being executable by one or more processors for tokenizing natural language text in a web browser environment. The method may include receiving a query. The method may include generating a query set comprising at least one query token. The method may include generating at least one of a result set and a supplemental set from a searchable phrase. The result set and the supplemental set can comprise at least one phrase token. The method can include determining that the query and the searchable phrase comprise: a first character-type, a second character-type, or an emoji. In response to determining that the query and searchable phrase comprise the first character-type, the method can include determining at least one word boundary; determining at least one diacritic in the searchable phrase; and extracting the at least one diacritic from the result set and the supplemental set. In response to determining that the query and the searchable phrase comprise the second-type or the emoji, the method can include adding a space around each second character-type or emoji in the query set and the result set. The method can include segmenting the query set and result set into a plurality of tokens.

BRIEF DESCRIPTION OF THE DRAWINGS

To easily identify the discussion of any particular element or act, the most significant digit or digits in a reference number refer to the figure number in which that element is first introduced.

FIG. 8 illustrates a block diagram illustrating an exemplary computing environment for text segmentation in a browser environment.

FIG. 9 illustrates an example flow diagram for providing ephemeral messages, according to certain aspects of the disclosure.

DETAILED DESCRIPTION

The disclosure overcomes issues currently present when performing natural language text tokenization in a web browser environment. In an embodiment of the disclosure, the web browser environment can be a self-contained browser application that cannot rely on server for text tokenization. The applications in the web browser environment can include aspects of text-segmentation in a web browser environment including: word-breaking, text wrapping, and text searches in a text editor. In other instances, the disclosure can be used to search message text in a messaging platform such as WhatsApp. Operating a text segmentation protocol in a web browser environment creates certain difficulties. For example, there are certain limitations in size and interaction with third-party operating systems. These difficulties exist because the web browser environment must operate under certain standards such that the browser functions/is compatible to all browsers. The compatibility requirements of a web browser can limit the availability to natural language processing that may be available through the operating system of a desktop or mobile device. When the underlying task is to segment (tokenize) natural language text, the operating system of a mobile device or desktop can have access to libraries for Natural Language Processing. A toolkit to aid the natural language processing can add 12.3 MB to the binary size, and the Chinese-tokenizer alone would have added an additional 8.9 MB to binary size. Again, utilizing the language processing tool kit and third-party libraries may not always be possible when operating in a web browser environment due to potential compatibility issues in the web browser. The current disclosure overcomes the problem of implementing a multilanguage tokenizer (text-segmentation) based on a heuristic approach to operate within the limitations of a web browser environment.

Figure 1:
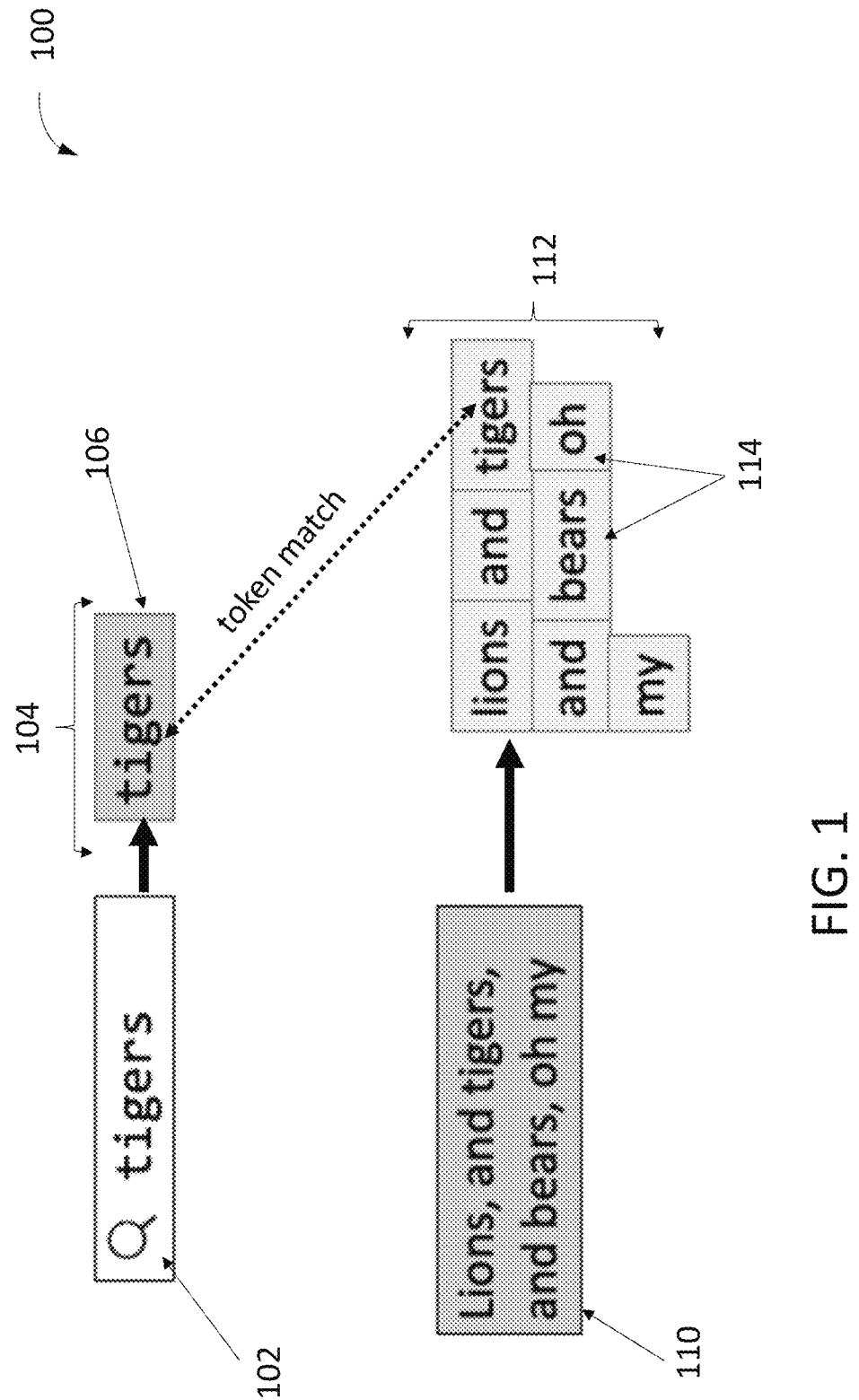
FIG. 1 illustrates a flow diagram for an exemplary text segmentation process.

In the heuristic approach, the tokenizer operating in the tokenizer module can implement rule paradigms related to at least three character-types. The first character-type (script) can include Latin-rooted languages including but not limited to English, French, German, Italian, Spanish and Croatian. The first character-type can also be Greek or Cyrillic script. As shown in FIG. 1, during tokenizer module 100, the user can submit a query 102. The query can then be converted to a query set 104. The query set 104 can comprise at least one query token 106 to be used in matching with phrase token 114 generated by the tokenizer module. In one aspect, the phrase token 114 can be generated from a searchable phrase 110 stored on the computing device. In one aspect, the tokenizer module can identify words rooted in the Latin languages to generate a result set 112. The result set can comprise a plurality of Phrase tokens 114. In a further aspect, the letters can be converted to their representative characters from the Unicode database. In a further aspect, the tokenizer can define a token based on a word. The word can be defined by traditional word boundaries. These word boundaries can be any separator including: tabs, newlines, punctuation, numbers (e.g., 1, 2, 3, etc.), and/or symbols ($, @,%, etc.).

Figure 2:
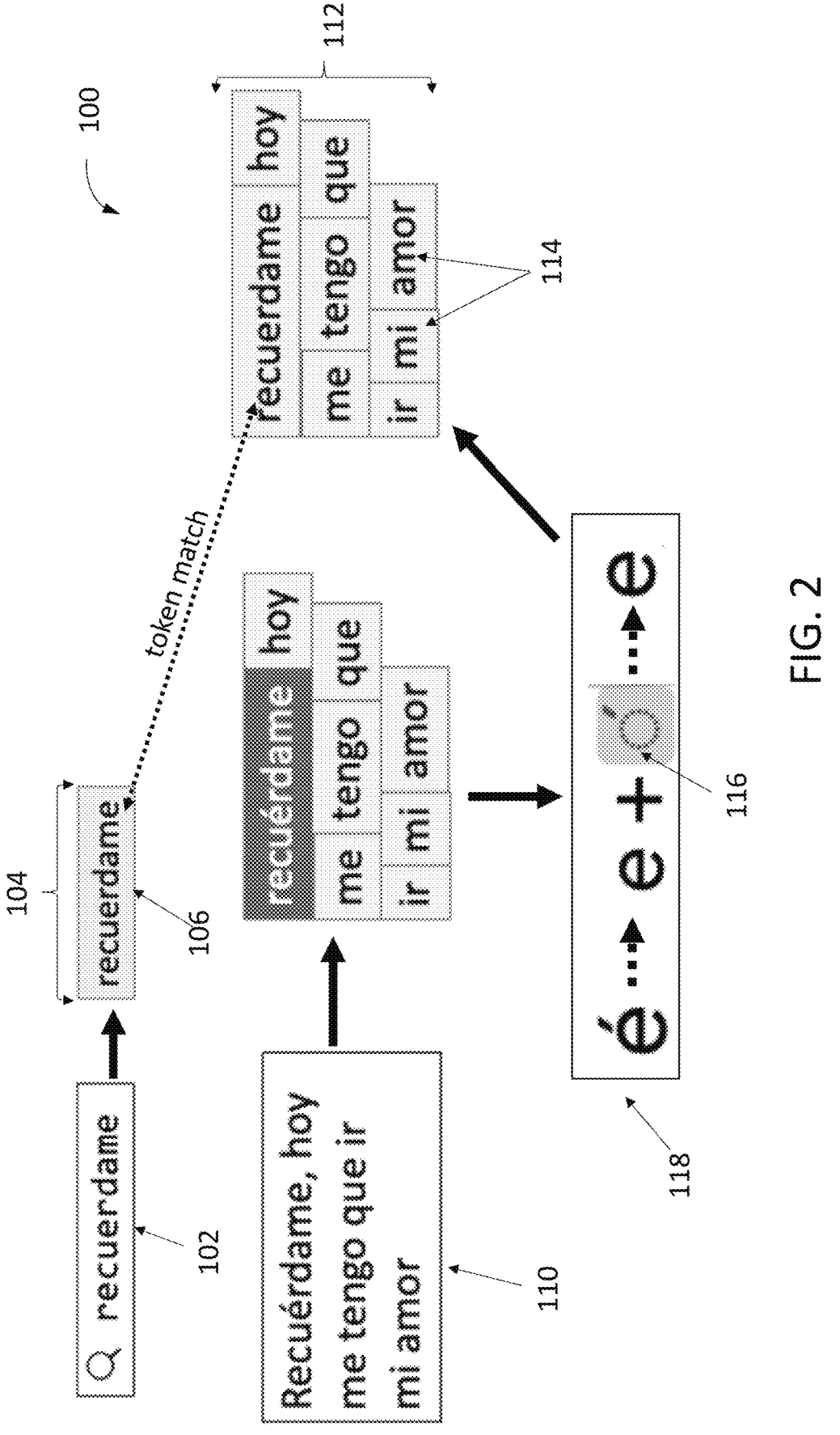
FIG. 2 illustrates a flow diagram for an alternate embodiment of a text segmentation process.

Referring to FIG. 2, the tokenizer 100 can handle situations where the language, such as Spanish, has accents or other diacritics used to indicate an emphasis when speaking a word. The tokenizer 100 can identify the diacritic 116. The tokenizer can implement a subroutine 118 to remove the diacritic to simplify the search. For example, the tokenizer can split a letter with an accent into two distinct components. The first component can be the letter and the second component can be the diacritic. Each component can be represented as a Unicode character from the Unicode database. In a further aspect, when the message is encoded in a decomposed form, then a Unicode Regex subroutine can remove the diacritic.

Figure 3:
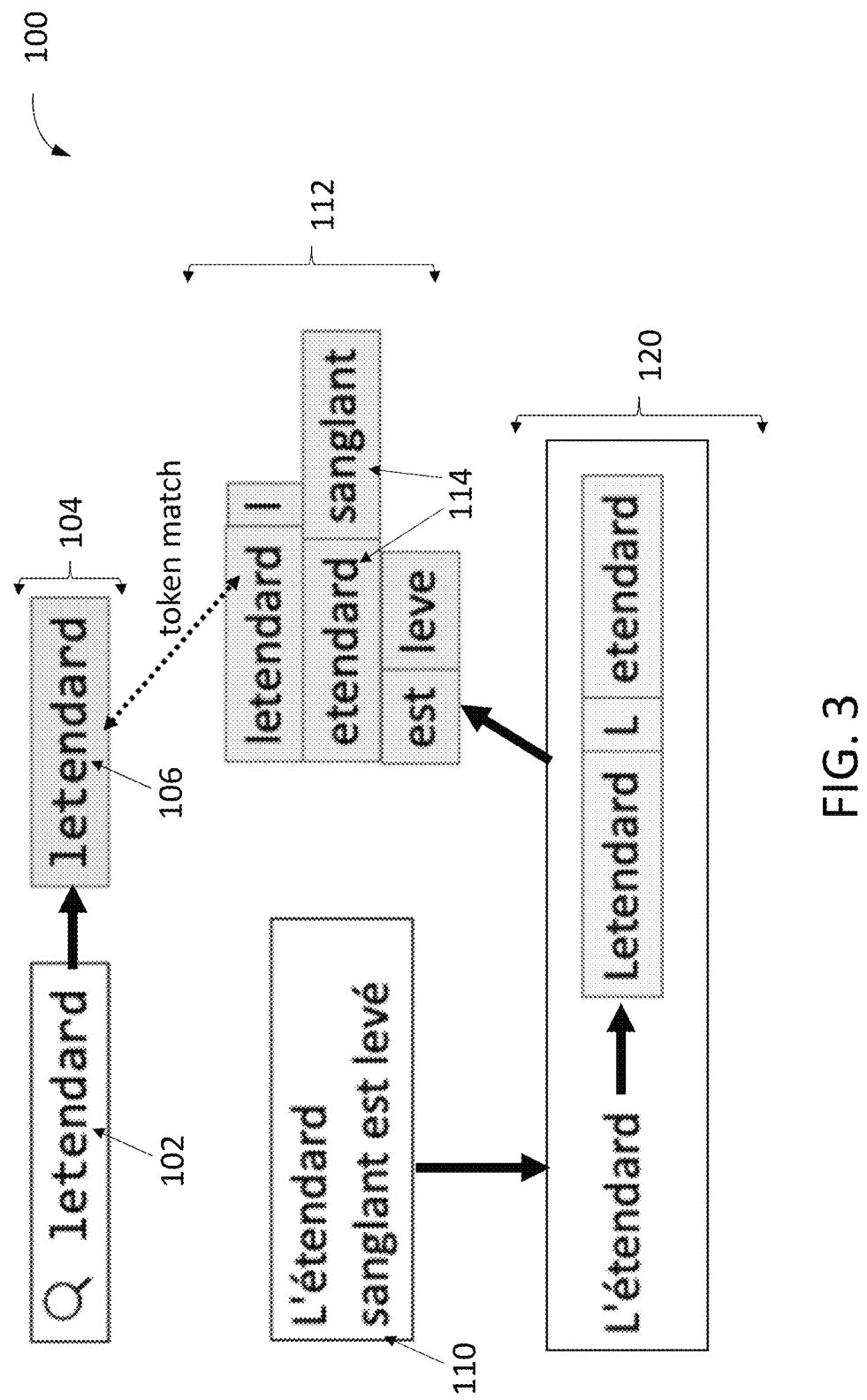
FIG. 3 illustrates a flow diagram for an alternate embodiment of a text segmentation process.

In referring to FIG. 3, the tokenizer 100 can also address situations when the query or messages comprise an apostrophe mark "" as punctuation. The tokenizer can account for message queries that may not have the same form of the word with the apostrophe. As shown in FIG. 3, the contracted word from the result set will be converted into supplemental set 120. The supplemental set 120 can comprise variants of the contracted word. For example, if the query comprises the contracted word "don't", the tokenizer ## is configured to include the words "dont", "don", and "t". As a result, the number of Phrase tokens 114 in the result set 112 can be expanded and increase the likelihood of a match between the query tokens 106 and Phrase tokens 114.

Figure 4:
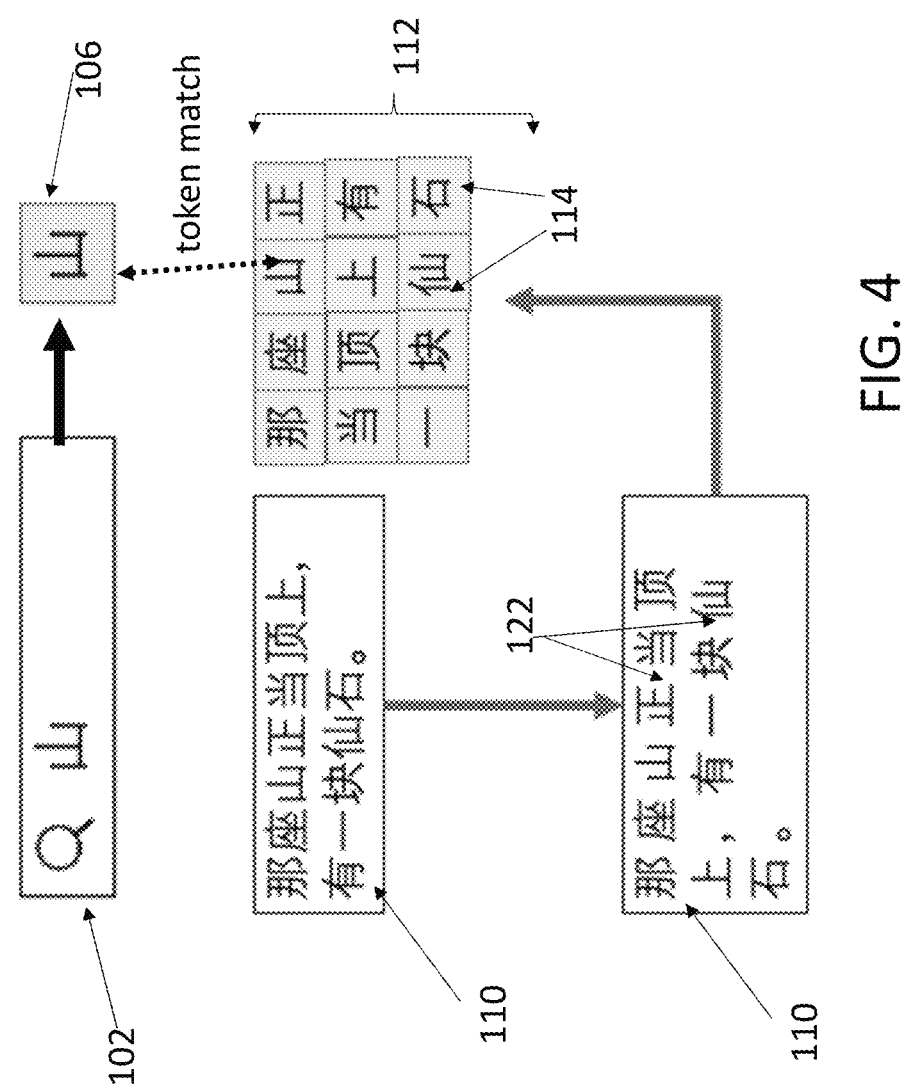
FIG. 4 illustrates a flow diagram for an alternate embodiment of a text segmentation process.

In referring to FIG. 4, the tokenizer 100 can implement a subroutine that identifies Chinese or Japanese characters for matching in searches. As discussed earlier, one of the primary issues in using the heuristic approach is to logically manage and account for searches involving different languages. In the case of the Chinese language, each character can represent a different word. However, unlike the Latin-type languages, the Chinese written language is not entirely characterized by spaces. Interpretations of the Chinese language may be optimized when a dictionary can be used. However, the size of the dictionary required to discretely recognize each character would far exceed the constraints of the binary size (e.g., 6 MB for WhatsApp). To overcome the constraint of the binary size, the tokenizer 100 converts each individual Chinese character into a Phrase token in the result set. In particular, the tokenizer 100 can place a space 122 after each Chinese character and each form of punctuation in the result set 112. The punctuation can then be extracted from the result set and each character separated by a space can be converted to a phrase token 114. Making each character in the message query a token can increase the likelihood that the search will capture the proper message. The tokenizer can facilitate searches when the query is an emoji.

Figure 5:
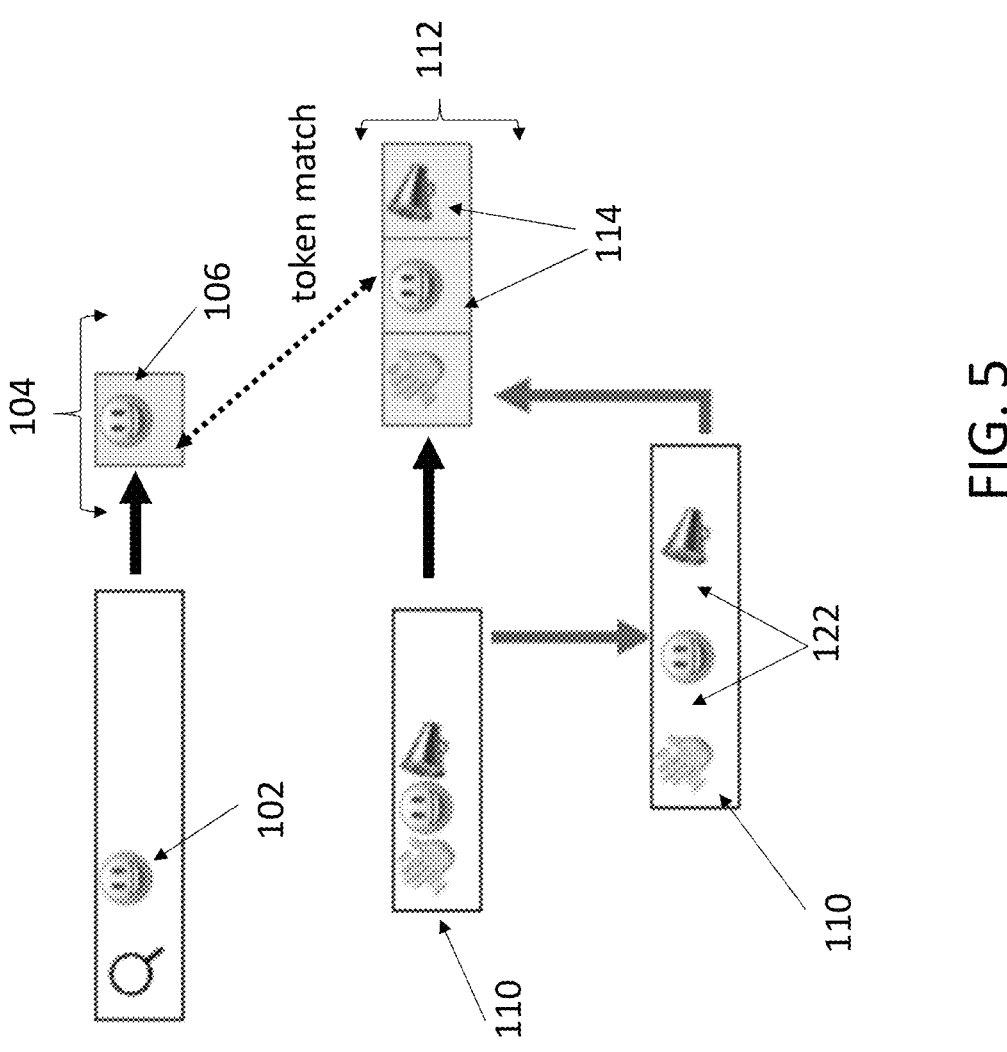
FIG. 5 illustrates a flow diagram for an alternate embodiment of a text segmentation process.
Figure 6:
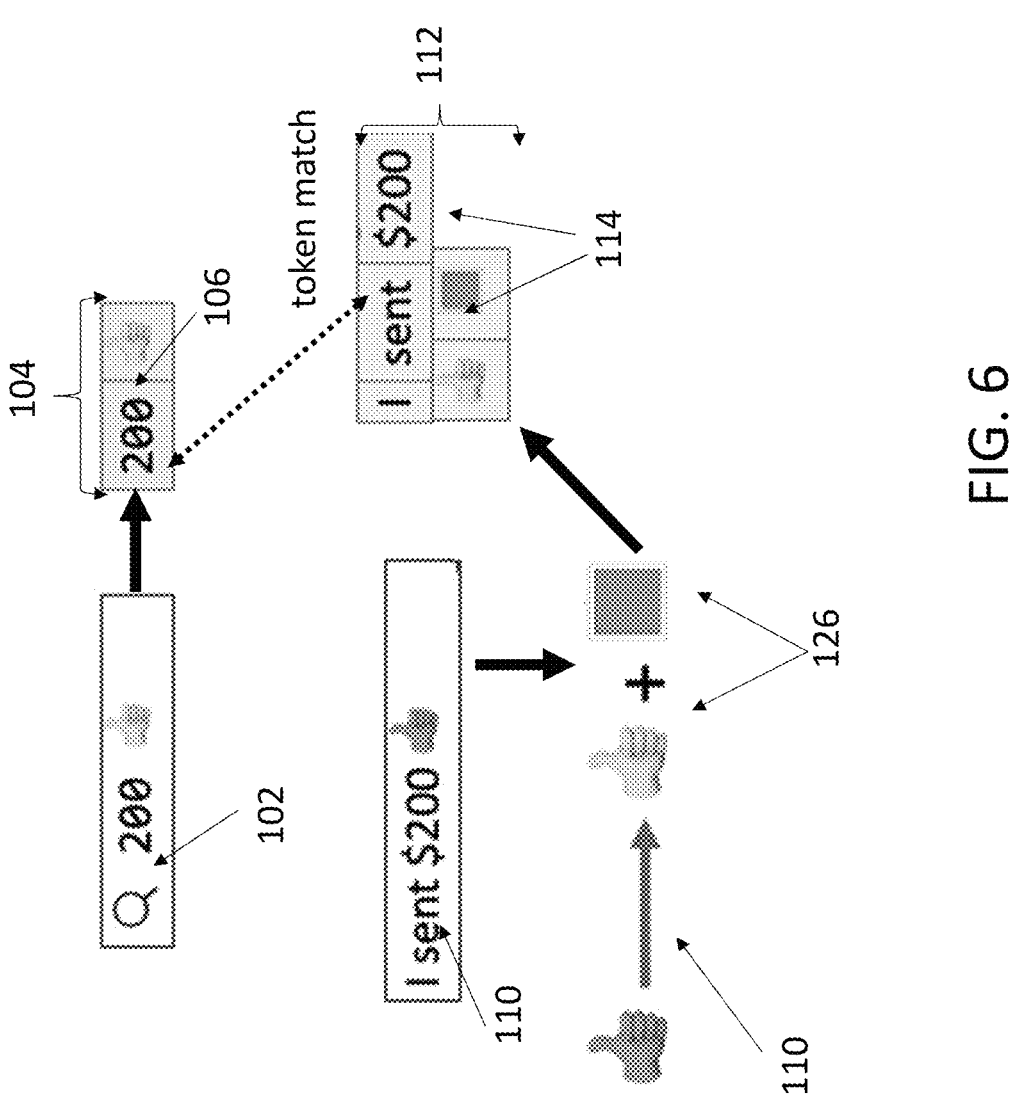
FIG. 6 illustrates a flow diagram for an alternate embodiment of a text segmentation process.

Referring to FIG. 5, an emoji is not script or characters in the same manner as the languages of the first and second type of character; the emoji can still be segmented for a token. In one aspect, the system can recognize the text includes an emoji. The tokenizer 100 can place spaces between each emoji to implement a form of segmentation for the emoji. As depicted in FIG. 6, emojis can become more complicated. In order to segment a more complicated emoji, the elements of the emoji can be identified segmented into the emoji's constituent elements 126. For instance, as depicted in FIG. 6, the thumbs up emoji has a brown skin tone. During the tokenization, the brown thumbs up can be tokenized into a combination of the universal thumbs-up emoji and with a skin tone modifier.

Figure 7:
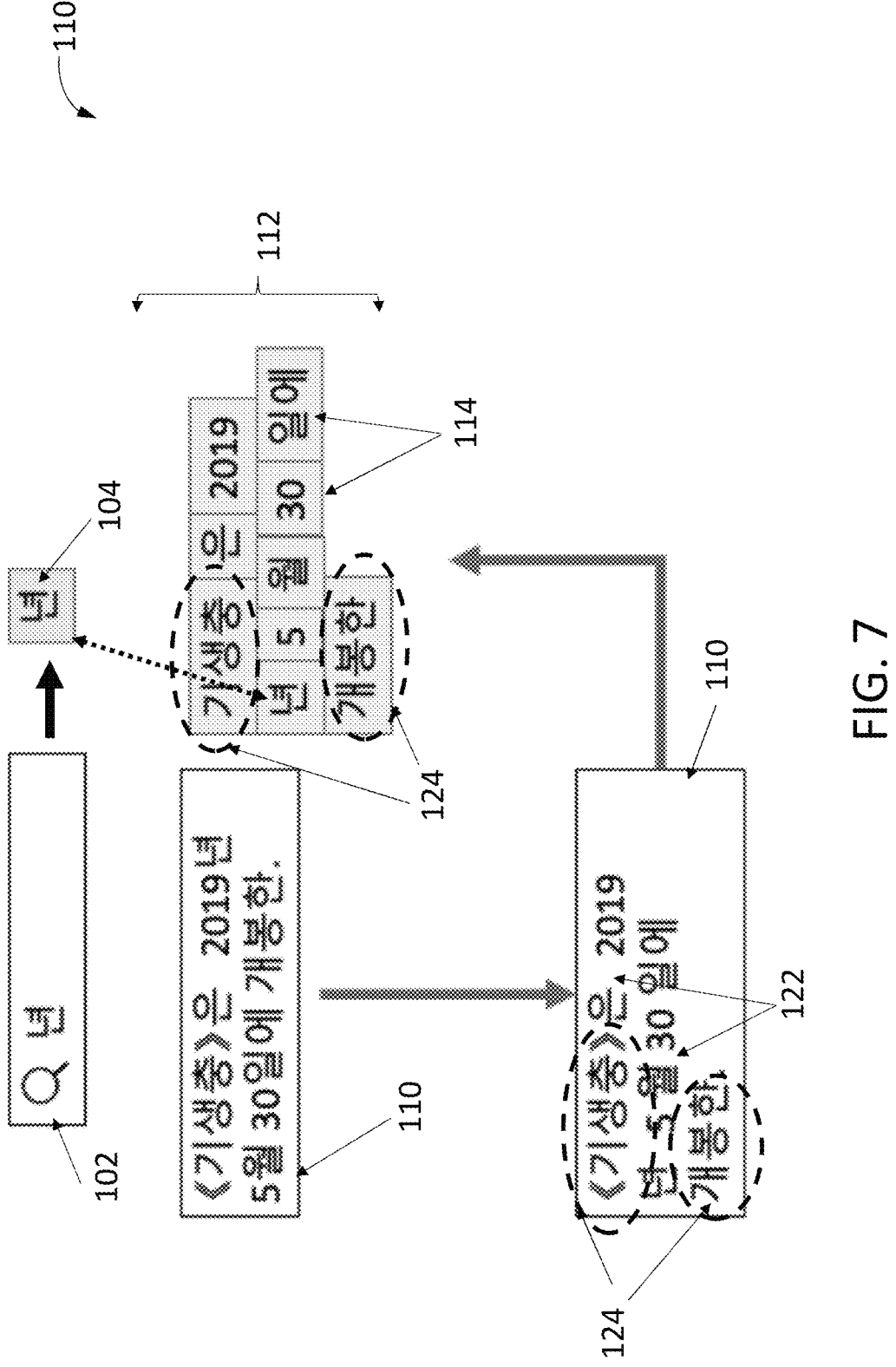
FIG. 7 illustrates a flow diagram for an alternate embodiment of a text segmentation process.

As shown in FIG. 7, the tokenizer 100 can process another type of script or third type of character, which is Korean script. A primary difference between the first character-type and the third character-type is that the script of the Korean/Thai can comprise Arabic numerals (e.g., 1, 2, 3, 4, 5, etc.) integrated within the characters of the script. For example, as shown in FIG. 7, the Korean script can include the numbers "5", "30", and "2019". The tokenizer can process Korean/Thai script 124, which can comprise multiple characters, in a similar manner of Latin, Greek, and Cyrillic languages because the tokenizer can segment a token based on script 124 boundaries. For example, the script boundaries of the Korean/Thai can comprise spaces, numbers, and symbols that are naturally integrated into the Korean/Thai script. In a further aspect, a space, punctuation, or Arabic numeral can define the boundary for a script. Chinese characters do not naturally have a space in-between the characters. As depicted in FIG. 7, convert to a result set 112, the tokenizer 100 identifies spaces 122 at the end of a script for Korean characters.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

The disclosed system(s) address a problem in traditional applications providing ephemeral messages techniques tied to computer technology, namely, the technical problem of making ephemeral messages unidentifiable as such to any interceptors between a sender device and a receiver device. The disclosed system solves this technical problem by providing a solution also rooted in computer technology, namely, by providing for obfuscating an exact location of a user. The disclosed subject technology further provides improvements to the functioning of the computer itself because it improves processing and efficiency in providing ephemeral messages.

FIG. 8 illustrates a system 800 configured for tokenizing queried messages, according to certain aspects of the disclosure. In some implementations, system 800 may include one or more computing platforms 802. Computing platform(s) 802 may be configured to communicate with one or more remote platforms 804 according to a client/server architecture, a peer-to-peer architecture, and/or other architectures. Remote platform(s) 804 may be configured to communicate with other remote platforms via computing platform(s) 802 and/or according to a client/server architecture, a peer-to-peer architecture, and/or other architectures. Users may access system 800 via remote platform(s) 804.

Computing platform(s) 802 may be configured by machine-readable instructions 806. Machine-readable instructions 806 may include one or more instruction modules. The instruction modules may include computer program modules. The instruction modules may include one or more of query module 808, tokenizer module 810, Language module 812, message storing module 814, and/or other instruction modules.

Query module 808 may be configured to receive, at a first device, a query from a user. The query can be in any of the known languages. In a further aspect, the characters in the query can be represented in Unicode characters. The tokenizer module 810 hosts the tokenizer 100. The tokenizer converts both the user query and searchable phrases in storage. The tokenizer module can communicate with the language module 812. The language module 812 can identify the characters within the query and searchable phrases to inform the tokenizer which process to employ when tokenizing the query and searchable phrases. In a further aspect, the language module can include a Unicode Character library. In yet a further aspect, the language module can comprise Message storing module 814 which may be configured to categorize the generated tokens or previous searches locally or on the electronic storage 830.

In some implementations, computing platform(s) 802, remote platform(s) 804, and/or external resources 828 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 802, remote platform(s) 804, and/or external resources 828 may be operatively linked via some other communication media.

A given remote platform 804 may include one or more processors configured to execute computer program modules. The computer program modules may be configured to enable an expert or user associated with the given remote platform 804 to interface with system 800 and/or external resources 828, and/or provide other functionality attributed herein to remote platform(s) 804. By way of non-limiting example, a given remote platform 804 and/or a given computing platform 802 may include one or more of a server, a desktop computer, a laptop computer, a handheld computer, a tablet computing platform, a NetBook, a Smartphone, a gaming console, and/or other computing platforms.

External resources 828 may include sources of information outside of system 800, external entities participating with system 800, and/or other resources. In some implementations, some or all of the functionality attributed herein to external resources 828 may be provided by resources included in system 800.

Computing platform(s) 802 may include electronic storage 830, one or more processors 832, and/or other components. Computing platform(s) 802 may include communication lines, or ports to enable the exchange of information with a network and/or other computing platforms. Illustration of computing platform(s) 802 in FIG. 8 is not intended to be limiting. Computing platform(s) 802 may include a plurality of hardware, software, and/or firmware components operating together to provide the functionality attributed herein to computing platform(s) 802. For example, computing platform(s) 802 may be implemented by a cloud of computing platforms operating together as computing platform(s) 802.

Electronic storage 830 may comprise non-transitory storage media that electronically stores information. The electronic storage media of electronic storage 830 may include one or both of system storage that is provided integrally (i.e., substantially non-removable) with computing platform(s) 802 and/or removable storage that is removably connectable to computing platform(s) 802 via, for example, a port (e.g., a USB port, a firewire port, etc.) or a drive (e.g., a disk drive, etc.). Electronic storage 830 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 830 may include one or more virtual storage resources (e.g., cloud storage, a virtual private network, and/or other virtual storage resources). Electronic storage 830 may store software algorithms, information determined by processor(s) 832, information received from computing platform(s) 802, information received from remote platform(s) 804, and/or other information that enables computing platform(s) 802 to function as described herein.

Processor(s) 832 may be configured to provide information processing capabilities in computing platform(s) 802. As such, processor(s) 832 may include one or more of a digital processor, an analog processor, a digital circuit designed to process information, an analog circuit designed to process information, a state machine, and/or other mechanisms for electronically processing information. Although processor(s) 832 is shown in FIG. 8 as a single entity, this is for illustrative purposes only. In some implementations, processor(s) 832 may include a plurality of processing units. These processing units may be physically located within the same device, or processor(s) 832 may represent processing functionality of a plurality of devices operating in coordination. Processor(s) 832 may be configured to execute modules 808, 810, 812, and 814, and/or other modules. Processor(s) 832 may be configured to execute modules 808, 810, 812, and 814, and/or other modules by software; hardware; firmware; some combination of software, hardware, and/or firmware; and/or other mechanisms for configuring processing capabilities on processor(s) 832. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 808, 810, 812, and 814 are illustrated in FIG. 8 as being implemented within a single processing unit, in implementations in which processor(s) 832 includes multiple processing units, one or more of modules 808, 810, 812, and 814 may be implemented remotely from the other modules. The description of the functionality provided by the different modules 808, 810, 812, and 814 described below is for illustrative purposes, and is not intended to be limiting, as any of modules 808, 810, 812, and 814 may provide more or less functionality than is described. For example, one or more of modules 808, 810, 812, and 814 may be eliminated, and some or all of its functionality may be provided by other ones of modules 808, 810, 812, and 814. As another example, processor(s) 832 may be configured to execute one or more additional modules that may perform some or all of the functionality attributed below to one of modules 808, 810, 812, and 814.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

FIG. 9 illustrates an example flow diagram (e.g., process 900) for providing ephemeral messages, according to certain aspects of the disclosure. For explanatory purposes, the example process 900 is described herein with reference to FIGS. 1-7. Further for explanatory purposes, the steps of the example process 900 are described herein as occurring in serial, or linearly. However, multiple instances of the example process 900 may occur in parallel. For purposes of explanation of the subject technology, the process 900 will be discussed in reference to FIGS. 1-7.

At step 902, the process may include receiving a query. The query can be received from a user via some text input in a graphical user interface. At step 904, the process may include generating a query set comprising at least one query token. At step 906, the process 900 may include generating at least one of a result set and a supplemental set from a searchable phrase, wherein the result set and the supplemental set comprises at least one phrase token. At step 908, the process 900 may include determining that the query and the searchable phrase comprise: a first character-type, a second character-type, or an emoji. At step 910, the process 900 may include, in response to determining that the query and searchable phrase comprise the first character-type, determining a word boundary; determining a diacritic and extracting the diacritic. At step 912, the process 900 can, in response to determining that the query and the searchable phrase comprise the second-type or the emoji, adding a space around each second character-type or emoji in the query set and the result set. At step 914, the process 900 can conclude with segmenting the query set, result set and the supplemental set into a plurality of tokens.

According to an aspect, wherein generating the supplemental set from a searchable phrase comprises determining an apostrophe in the searchable phrase and generating a plurality of text phrases based on the apostrophe.

According to an aspect, the process 900 further includes determining that the query and the searchable phrase comprise a third character-type, and in response to determining that the query and searchable phrase comprise the third character-type, identifying a script boundary in the query set, the result set, and the supplemental set, and adding a space around a script boundary in the query set, the result set and the at least one supplemental set.

According to an aspect, segmenting the query set, result set and supplemental set into a plurality of tokens is based on the space defining a word boundary of the first character-type or the space added around each of the second character-type, or the emoji.

According to an aspect, the process 900 further includes matching a first set of the plurality of tokens associated with the query set to a second set of the plurality of tokens associated with the result set and the supplemental set.

According to an aspect, the process 900 further includes comprising generating a search result based on matches between the first set of the plurality of tokens to the second set of the plurality of tokens.

According to an aspect, the process 900 further includes identifying currency symbols in the result set or supplemental set; adding spaces around currency symbols in the result set or supplemental set, and extracting currency symbols from the result set or supplemental set. For example, the space can be a "_" character that a protocol can recognize and differentiate the symbol from the adjacent script. In a further aspect, the process can evaluate the phrase "$500" and convert to "$500" to distinguish and generate two elements ("$" and "500").

According to an aspect, the process 900 further includes in response to determining that the at least one word boundary in the result set and supplemental set comprises a non-apostrophe punctuation or symbol and extracting a non-apostrophe punctuation or symbol from the result set.

According to an aspect, a normalization protocol can convert the natural language text of the first character-type to lower-case text. Such a normalization can increase the likelihood of matches when comparing a data set. For example, "Atlanta Shops" and "atlanta shops" may not result in a match since Atlanta and atlanta could be treated as two different words.

According to an aspect, the query is sent through a decentralized end-to-end encrypted messaging platform. Further, the message platform can be configured to operate in a web browser environment in the absence of libraries, whose space requirements are incompatible in a web browser environment.

According to an aspect, the process 900 further includes determining that the binary size of the web browser is below a threshold binary size. The threshold binary size can be below 5 megabytes to permit faster load times for a web application. In a further aspect, an implementation of the disclosure can be below 250 kilobytes.

According to an aspect, the process 900 further includes a supplemental normalization based in Unicode, wherein the supplemental normalization is configured to manage lower case letters using English lower casing and manage Arabic, Devnagri, and Indic characters. Managing can include transforming and removing of certain characters to improve searchability. The normalizers can also remove characters that most users would not explicitly search for, including punctuation, math symbols, modifier, symbols, emoji modifier symbols (skin-tone modifiers), and the Zero-Width-Joiner (ZWJ).

According to an aspect, a protocol can be used to determine the character-type of the text received from the query. In a further aspect, the protocol can be used to identify the script of the text. In yet a further aspect, a Unicode regex protocol can detect scripts or characters. For example, the Unicode Regex protocol can recognize Chinese characters in the "Han" script, Japanese characters in the "Hiragana" and "Katakana" scripts, etc.

Figure 10:
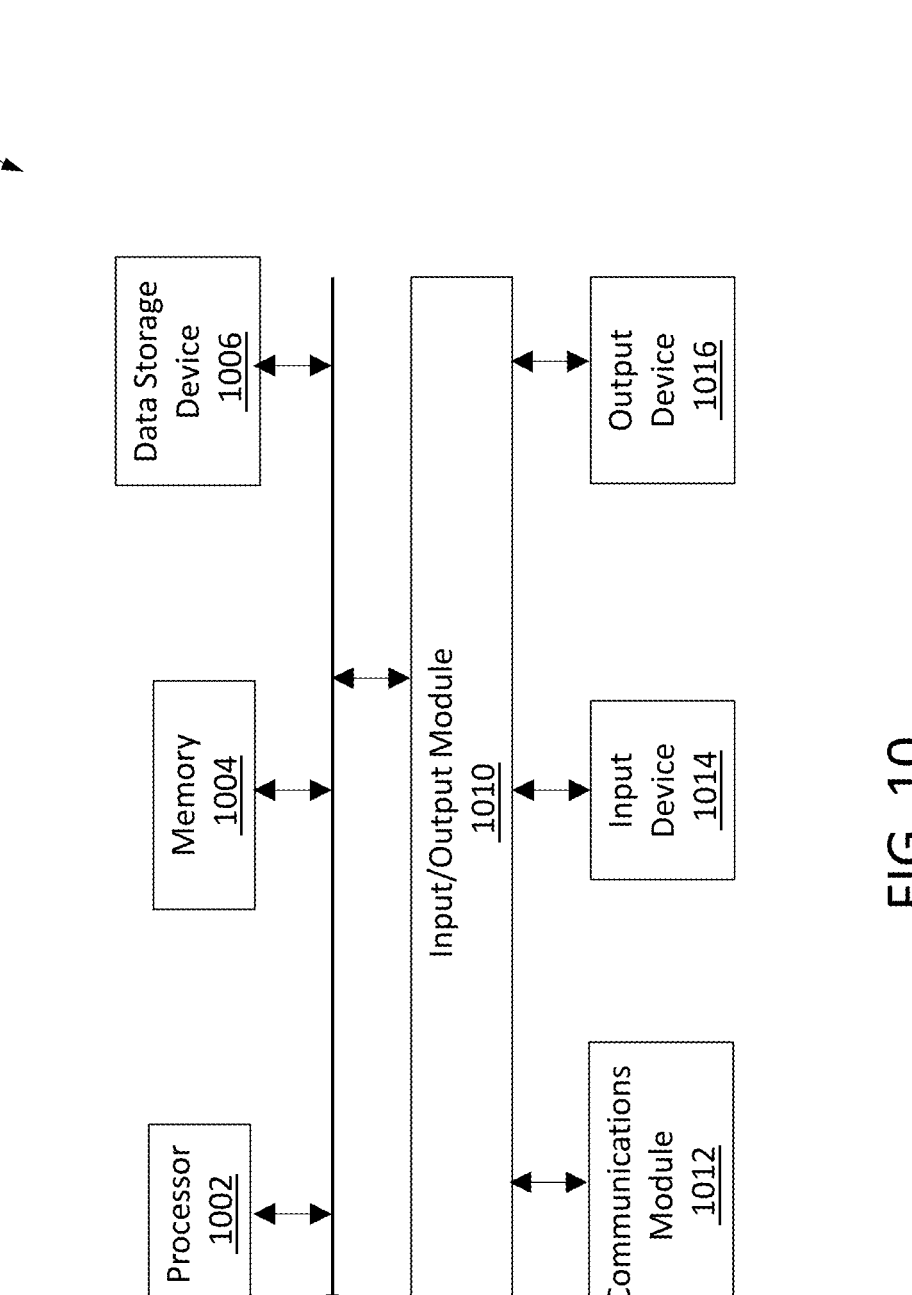
FIG. 10 is a block diagram illustrating an example computer system (e.g., representing both client and server) with which aspects of the subject technology can be implemented.

FIG. 10 is a block diagram illustrating an exemplary computer system 1000 with which aspects of the subject technology can be implemented. In certain aspects, the computer system 1000 may be implemented using hardware or a combination of software and hardware, either in a dedicated server, integrated into another entity, or distributed across multiple entities.

Computer system 1000 (e.g., server and/or client) includes an input/output module 1010 or other communication mechanism, such as a bus, for communicating information, and a processor 1002 coupled with the input/output module for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question, e.g., code that constitutes processor firmware, a protocol stack, a database management system, an operating system, or a combination of one or more of them stored in an included memory 1004, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to input/output module 1010 for storing information and instructions to be executed by processor 1002. The processor 1002 and the memory 1004 can be supplemented by, or incorporated in, special purpose logic circuitry.

The instructions may be stored in the memory 1004 and implemented in one or more computer program products, i.e., one or more modules of computer program instructions encoded on a computer-readable medium for execution by, or to control the operation of, the computer system 1000, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 1004 may also be used for storing temporary variable or other intermediate information during execution of instructions to be executed by processor 1002.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 1000 further includes a data storage device 1006 such as a magnetic disk or optical disk, coupled to input/output module 1010 for storing information and instructions. Computer system 1000 may be coupled via input/output module 1010 to various devices. The input/output module 1010 can be any input/output module or bus. Exemplary input/output modules 1010 include data ports such as USB ports. The input/output module 1010 is configured to connect to a communications module 1012. Exemplary communications modules 1012 include networking interface cards, such as Ethernet cards and modems. In certain aspects, the input/output module 1010 is configured to connect to a plurality of devices, such as an input device 1014 and/or an output device 1016. Exemplary input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 1016 include display devices such as an LCD (liquid crystal display) monitor, for displaying information to the user.

According to one aspect of the present disclosure, the above-described text segmentation platform can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in the main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 1000 can include clients and servers. A client and server are generally remote from each other and typically interact through a communication network. The relationship of client and server arises by virtue of computer programs running on the respective computers and having a client-server relationship to each other. Computer system 1000 can be, for example, and without limitation, a desktop computer, laptop computer, or tablet computer. Computer system 1000 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 1002 for execution. Such a medium may take many forms, including, but not limited to, non-volatile media, volatile media, and transmission media. Non-volatile media include, for example, optical or magnetic disks, such as data storage device 1006. Volatile media include dynamic memory, such as memory 1004. Transmission media include coaxial cables, copper wire, and fiber optics, including the wires that comprise input/output module 1010. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip, or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 1000 reads game data and provides a game, information may be read from the game data and stored in a memory device, such as the memory 1004. Additionally, data from the memory 1004 servers accessed via a network the input/output device 1010, or the data storage 1006 may be read and loaded into the memory 1004. Although data is described as being found in the memory 1004, it will be understood that data does not have to be stored in the memory 1004 and may be stored in other memory accessible to the processor 1002 or distributed among several media, such as the data storage 1006.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for tokenizing natural language text in a web browser environment comprising:
  receiving a query;
generating a query set comprising at least one query token;
  generating at least one of a result set and a supplemental set from a searchable phrase, wherein the result set and the supplemental set comprises at least one phrase token;
  determining that the query and the searchable phrase comprise: a first character-type, a second character-type, a third character-type, or an emoji;
  in response to determining that the query and the searchable phrase comprise the first character-type:
    determining at least one word boundary,
    determining at least one diacritic in the searchable phrase, and
    extracting the at least one diacritic from the result set and the supplemental set;
  in response to determining that the query and the searchable phrase comprise the second type-character or the emoji, adding a space around each second character-type or emoji in the query set and the result set;
in response to determining that the query and the searchable phrase comprise the third character-type:
    identifying a script boundary in the query set, the result set, and the supplemental set, and
    adding a space around the script boundary in the query set, the result set and the supplemental set; and
  segmenting the query set and the result set into a plurality of tokens.

2. The computer-implemented method of claim 1, wherein generating the supplemental set from the searchable phrase comprises;
  determining an apostrophe in the searchable phrase; and
  generating a plurality of text phrases based on the apostrophe.

3. The computer-implemented method of claim 1, wherein segmenting the query set, the result set and supplemental set into the plurality of tokens is based on the space defining the word boundary of the first character-type or the space added around each of the second character-type, or the emoji.

4. The computer-implemented method of claim 1, further comprising matching a first set of the plurality of tokens associated with the query set to a second set of the plurality of tokens associated with the result set and the supplemental set.

5. The computer-implemented method of claim 4, further comprising generating a search result based on matches between the first set of the plurality of tokens to the second set of the plurality of tokens.

6. The computer-implemented method of claim 1, further comprising:
  identifying a currency symbol in the result set or the supplemental set;
  adding a space around the currency symbol in the result set or the supplemental set; and
  extracting the currency symbol from the result set or the supplemental set.

7. The computer-implemented method of claim 1, further comprising in response to determining that the at least one word boundary in the result set and the supplemental set comprises non apostrophe punctuation, extracting a non-apostrophe punctuation from the result set and the supplemental set.

8. A system for tokenizing natural language text in a web browser environment comprising:
  one or more hardware processors configured by machine-readable instructions to:
    receive a query;
    generate a query set comprising at least one query token;
    generate at least one of a result set and a supplemental set from a searchable phrase, wherein the result set and the supplemental set comprises at least one phrase token;
    determine that the query and the searchable phrase comprise: a first character-type, a second character-type, a third character-type, or an emoji;
    in response to determining that the query and the searchable phrase comprise the first character-type:
      determine at least one word boundary,
      determine at least one diacritic in the searchable phrase, and
      extract the at least one diacritic from the result set and the supplemental set;
    in response to determining that the query and the searchable phrase comprise the second type-character or the emoji, add a space around each second character-type or emoji in the query set and the result set;
    in response to determining that the query and the searchable phrase comprise the third character-type:
      identify a script boundary in the query set, the result set, and the supplemental set, and
      add a space around the script boundary in the query set, the result set and the supplemental set; and
    segment the query set and the result set into a plurality of tokens.

9. The system of claim 8, wherein the supplemental set from the searchable phrase comprises a plurality of text phrases based on an apostrophe identified in the searchable phrase.

10. The system of claim 8, wherein the one or more hardware processors configured by the machine-readable instructions to segment the query set, the result set and supplemental set into the plurality of tokens is based on the space defining the word boundary of the first character-type or the space added around each of the second character-type, or the emoji.

11. The system of claim 8, wherein the one or more hardware processors are configured by the machine-readable instructions to match a first set of the plurality of tokens associated with the query set to a second set of the plurality of tokens associated with the result set and the supplemental set.

12. The system of claim 11, wherein the one or more hardware processors are configured by the machine-readable instructions to generate a search result based on matches between the first set of the plurality of tokens to the second set of the plurality of tokens.

13. The system of claim 8, wherein the one or more hardware processors are configured by the machine-readable instructions to:

identify a currency symbol in the result set or supplemental set;

add spaces around the currency symbol in the result set or supplemental set; and extract the currency symbol from the result set or supplemental set.

14. The system of claim 8, wherein the one or more hardware processors are configured by the machine-readable instructions to determine that the at least one word boundary in the result set and supplemental set comprises non-apostrophe punctuation, extracting a non apostrophe punctuation from the result set and supplemental set.

15. A non-transient computer-readable storage medium having instructions embodied thereon, the instructions being executable by one or more processors to perform a method for tokenizing natural language text in a web browser environment comprising:

receiving a query;

generating a query set comprising at least one query token;

generating at least one of a result set and a supplemental set from a searchable phrase, wherein the result set and the supplemental set comprises at least one phrase token;

determining that the query and the searchable phrase comprise: a first character-type, a second character-type, a third character-type, or an emoji;

in response to determining that the query and the searchable phrase comprise the first character-type:

determining at least one word boundary, determining at least one diacritic in the searchable phrase, and extracting the at least one diacritic from the result set and the supplemental set;

in response to determining that the query and the searchable phrase comprise the second type-character or the emoji, adding a space around each second character-type or emoji in the query set and the result set;

in response to determining that the query and the searchable phrase comprise the third character-type:

identifying a script boundary in the query set, the result set, and the supplemental set, and adding a space around the script boundary in the query set, the result set and the supplemental set:

segmenting the query set and the result set into a plurality of tokens;

matching a first set of the plurality of tokens associated with the query set to a second set of the plurality of tokens associated with the result set and the supplemental set; and generating a search result based on matches between the first set of the plurality of tokens to the second set of the plurality of tokens.

16. The non-transient computer-readable storage medium of claim 15, wherein generating the supplemental set from the searchable phrase comprises determining an apostrophe in the searchable phrase; and generating a plurality of text phrases based on the apostrophe.

17. The non-transient computer-readable storage medium of claim 15, wherein segmenting the query set, the result set and the supplemental set into the plurality of tokens is based on the space defining the word boundary of the first character-type or the space added around each of the second character-type, or the emoji.

* * * * *